United States Patent [19]

Scholman, Jr. et al.

[11] Patent Number: 4,622,365

[45] Date of Patent: Nov. 11, 1986

[54] POLYETHER TREATED GUAYULE RESIN AND RUBBER COMPOSITIONS CONTAINING THE SAME

[75] Inventors: William W. Scholman, Jr., Stow; James A. Davis, Uniontown, both of Ohio

[73] Assignee: The Firestone Tire & Rubber Company, Akron, Ohio

[21] Appl. No.: 750,954

[22] Filed: Jul. 2, 1985

[51] Int. Cl.$^4$ .......................... C08C 19/22; B60C 1/00
[52] U.S. Cl. ................................ 525/332.5; 525/379; 525/381; 525/382; 528/930; 152/564
[58] Field of Search .......................... 525/332.5–333.1, 525/381, 382, 385, 333.9, 333.7, 379; 528/492, 494, 930–931; 152/564

[56] References Cited

U.S. PATENT DOCUMENTS

| | | | |
|---|---|---|---|
| 2,713,572 | 7/1955 | Wyandotte | 260/79.5 |
| 3,607,792 | 9/1971 | Speranza et al. | 260/2 A |
| 3,639,928 | 2/1972 | Bentley et al. | 260/47 EC |
| 3,730,908 | 5/1973 | Harvey | 252/426 |
| 3,875,072 | 4/1975 | Waddill | 252/182 |
| 3,941,732 | 3/1976 | Yukuta et al. | 525/332.5 |
| 4,127,514 | 11/1978 | Waddill | 528/93 |
| 4,434,266 | 2/1984 | Trivette, Jr. | 525/301 |

OTHER PUBLICATIONS

"Degradative Effects of Guayule Resin on Natural Rubber", Keller, Winkler, Stephens, Rubber Chemistry and Technology, vol. 54, No. 1, Mar.–Apr. 1981.

Primary Examiner—Joseph L. Schofer
Assistant Examiner—F. M. Teskin
Attorney, Agent, or Firm—Daniel N. Hall

[57] ABSTRACT

Guayule-type resins are chemically treated with an amine terminated polyether. The polyether treated guayule resins have high softening points and usually impart improved physical properties when used as rubber additives.

18 Claims, No Drawings

POLYETHER TREATED GUAYULE RESIN AND RUBBER COMPOSITIONS CONTAINING THE SAME

FIELD OF INVENTION

The present invention relates to guayule resins which are chemically treated with polyethers. More specifically, it relates to polyether cross-linked guayule resins which have high softening points and when used as rubber additives impart improved physical properties thereto such as tear strength, green strength of the unvulcanized rubber composition, reduced hysteresis loss and the like.

PRIOR ART

U.S. Pat. No. 2,713,572 to Hall relates to a method of vulcanizing conjugated diolefin type elastomers in which a thiazyl sulfide is employed as a primary accelerator and in which certain conjugated polyoxypropylene-polyoxyethylene compounds are included in the elastomer as an activator for the thiazyl sulfide. However, no disclosure is made of the use of a guayule-type resin or the chemical treatment thereof with a polyether.

U.S. Pat. No. 3,607,792 to Speranza and Waddill relates to polyoxypropylene polyamines as vulcanizing agents for halogen-containing polymers such as polyepichlorohydrin. The cured polymers are useful specialty rubbers which are resistent to ozone attacks.

U.S. Pat. No. 3,639,928 to Bentley and Godfrey relates to a combination of compounds for accelerating the cure of a polyglycidyl ether of a polyhydric phenol cured with a polyoxyalkylene polyamine. The epoxy resin product is useful in castings, coatings, adhesives, laminates, and the like.

U.S. Pat. No. 3,730,908 to Harvey relates to mixtures of a polyglycol polyamine and an alkylene polyamine, which when added to polyepoxides provide compositions which are useful in coatings, castings, and the like.

U.S. Pat. No. 3,875,072 to Waddill relates to a combination of accelerators for accelerating the cure of a polyglycidyl ether of a polyhydric phenol cured with a polyoxyalkylene polyamine at ambient or elevated temperatures.

U.S. Pat. No. 4,127,514 to Waddill relates to a process for accelerating the cure of epoxy resins by mixing an epoxy resin of a polyhydric phenol, a polyglycidyl ether with an accelerator-hardener combination.

An article by Keller et al, Rubber Chem. Technol., 1981, 54(1), 115–123 relates to the use of guayule resin as a plasticizer in rubber compositions.

The above patents fall to disclose the use of polyoxyalkylene amines to modify guayule resin or the use of polyoxyalkylene amine modified guayule resin to improve the properties of unvulcanized or vulcanized rubber compositions.

SUMMARY OF THE INVENTION

Accordingly, it is an aspect of the present invention to provide guayule resin chemically treated with a polyether.

It is another aspect of the present invention to provide resinous polyether derivatives, as above, which are useful as rubber additives.

It is a further aspect of the present invention to provide resinous polyether derivatives, as above, which increase the green strength of unvulcanized rubber compositions as well as activate the cure of sulfur-vulcanized rubber compositions.

It is a still further aspect of the present invention to provide resinous polyether derivatives, as above, which increase the tear strength and/or decrease the hysteresis loss properties of vulcanized rubber compositions.

These and other aspects of the present invention will become apparent from the following detailed specification.

In general, a composition of matter comprises guayule resin chemically treated with an amine terminated polyether.

DETAILED DESCRIPTION OF THE INVENTION

According to the present invention, guayule or guayule-like resins are chemically treated with polyethers such as amine terminated polyethers to form derivatives thereof which are at least useful in various rubber compositions. Among the plant materials that can be used as sources of guayule resins and guayule-like or guayule type resins are a large number of plant species bearing rubber and rubber-like hydrocarbons. These include particularly guayule itself, gopher plant (*Euphorbia lathyris*), mariola (*Parthenium incanum*), rabbitbrush (*Chrysothamnus nauseosus*), candelilla (*Pedilanthus macrocarpus*), Madagascar rubbervine (*Cryptostegia grandiflora*), milkweeds (*Asclepias syriaca, speciosa, subulate,* et al), goldenrods (*Solidago altissima, graminifolia, rigida,* et al), pale Indian plantain (*Cacalia atriplicifolia*), Russian dandelion (*Taraxacum kok-saghyz*), mountain mint (*Pycnanthemum incanum*), American germander (*Teucreum canadense*) and tall bellflower (*Campanula americana*). Many other plants which produce rubber and rubber-like hydrocarbons are known, particularly among the Asteraceae (Compositae), Euphorbiaceae, Campanulaceae, Labiatae, and Moraceae families.

Guayule resin prepared from such plants are generally extracted with an organic polar solvent. Such polar solvents include alcohols having from 1 to 8 carbon atoms, for example methanol, ethanol, isopropanol, and the like; esters having from 3 to 8 carbon atoms such as the various formates, the various acetates, and the like; and ketones having from 3 to 8 carbon atoms, such as acetone, methyl ethyl ketone, and the like. The preferred extraction solvent is acetone or ethyl alcohol. The resin generally constitutes about 6 to about 15 percent of the dry weight of the plant. The resin can be obtained by any conventional extraction method such as solvent extraction of the whole shrub, including the leaves, the woody tissue, and the like. Generally a suitable crush or grinding step is initially utilized, for example, a hammermill. The organic polar solvent can then be added to the crushed guayule plant material to extract the resin therefrom. Naturally, other common or conventional resin extraction methods can be utilized.

The extracted guayule resin contains a wide variety of components with the most abundant constituents being triterpene ketoalcohols (see Rodriquez-Hahn et al, Rev. Latinoamer. Quim., 1970, 1(1), 24–28. Another constituent are the diterpene ketoalcohols (see Dorado Bernal et al., Chim. Ind. (Paris), 1962, 87(5), 612–620). Other constituents include polyphenolics and free acids (see Buchanan et al., J. Am. Oil Chem. Soc., 1978, 55(9), 657–662).

Once the guayule resin has been extracted, desirably it is physically processed as by vacuum or steam devolatilization or extraction with a hydrocarbon solvent such as hexane, or the like. Devolatilization removes low boiling oils which often cause undesirable odors and excessive softening when present. Suitable hydrocarbons include the alkanes having from 4 to about 9 carbon atoms such as heptane, the cycloalkanes having from about 5 to about 10 carbon atoms such as cyclohexane, and the like. The hydrocarbon extraction step allows separation of less-soluble polar compounds which are removed as an insoluble residue. The hydrocarbon insoluble portion of the resin is recovered for chemical treatment with the polyethers of the present invention. Combinations of various physical treatments can also be utilized.

According to the concepts of the present invention, the above extracted guayule resin is treated by chemical reaction with an amine terminated polyether.

With regard to the amine terminated polyethers, some of them can be represented by the formula $$H_2N-Alkylene-O-Alkylene-_nNH_2 \quad \text{(Formula 1)}$$

wherein n is an integer from about 2 to about 100, desirably from about 2 to about 70 and preferably from about 2 to about 5, and wherein each "Alkylene", independently, has from 2 to about 10 carbon atoms with 2 carbon atoms, that is ethylene, or 3 carbon atoms, that is propylene, being preferred. The "Alkylene" group can be branched or straight. Specific examples of such amine terminated polyethers include the Jeffamine D-Series produced by the Texaco Chemical Co. and have the formula

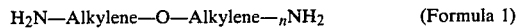

The various types of available Jeffamine D-Series products include the following

| Product | n | Approx. Mol. Wt. |
|---|---|---|
| Jeffamine D-230 | 2–3 | 230 |
| Jeffamine D-400 | 5–6 | 400 |
| Jeffamine D-2000 | 33 | 2000 |
| Jeffamine D-4000 | 68 | 4000 |

Other types of amine terminated polyethers suitable for use in the present invention are represented by the formula

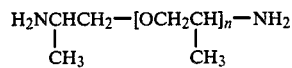

wherein each "Alkylene", independently, is set forth above, and wherein i plus k is an integer of from about 2 to 25, desirably from about 2 to about 10 and preferably from about 2 to about 5. The number of repeating units represented by j is an integer of from about 1 to about 200, desirably from about 2 to about 150 and preferably from about 2 to about 10. Examples of such suitable polyethers include the Jeffamine ED-Series produced by the Texaco Chemical Co. and have the formula

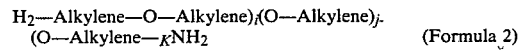

Examples of such specific Jeffamine ED-Series polymers include the following:

| Product | j | i + k | Approx. Mol. Wt. |
|---|---|---|---|
| Jeffamine ED-600 | 8.5 | 2.5 | 600 |
| Jeffamine ED-900 | 15.5 | 2.5 | 900 |
| Jeffamine ED-2001 | 40.5 | 2.5 | 2000 |
| Jeffamine ED-4000 | 86.0 | 2.5 | 4000 |
| Jeffamine ED-6000 | 131.5 | 2.5 | 6000 |

Still another type of suitable amine terminated polyethers which can be utilized in the present invention are those generally represented by the formula

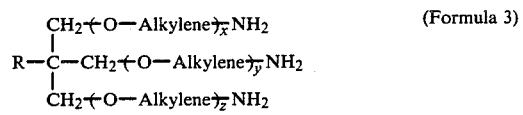

wherein each "Alkylene", independently, is set as forth above, that is, has from 2 to about 10 carbon atoms therein with 2 or 3 carbon atoms being preferred. The total number of x+y+z integers is from about 2 to about 100, desirably from about 2 to about 10 and preferably from about 5 to about 10. R is hydrogen or an aliphatic group with a desirable aliphatic group being an alkyl. When R is an alkyl it has from about 1 to about 5 carbon atoms with 1 or 2 carbon atoms being preferred. Examples of such suitable polyethers include the Jeffamine T-Series produced by the Texaco Chemical Company and have the formula

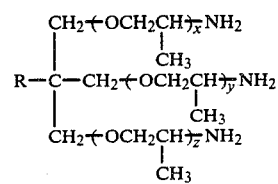

Examples of such specific Jeffamine T-Series include the following:

| Product | Approx. Value x + y + z | Approx. Mol. Wt. |
|---|---|---|
| Jeffamine T-403 | 5–6 | 440 |
| Jeffamine T-3000 | 50 | 3000 |
| Jeffamine T-5000 | 85 | 5000 |

The chemical reaction of the amine-terminated polyether with guayule resin proceeds by condensation of the amine groups with the various guayule resin components such as triterpene ketoalcohol and free acid to produce ketimine, enamine and amide derivatives with water being formed as a by-product. The reaction may be carried out by treating a hydrocarbon solvent solution of guayule resin in the presence of an amine-terminated polyether or a combination of amine-terminated polyethers at a temperature of about 65°–200° C., preferably about 65°–130° C. The reaction desirably is carried out at approximately atmospheric pressure. Preferred solvents include benzene, toluene, and xylene. The reaction mixture must be maintained at a temperature sufficient to remove the by-product water. Desirably the temperature is such that the water is removed by azeotropic distillation. The reaction mixture can be agitated by mechanical means or by the use of a nitrogen sparge. A nitrogen sparge also serves to remove solvent and volatile by-products at the conclusion of the reaction. Alternatively, the reaction may be carried out under vacuum by treating guayule resin with an amine-terminated polyether or a combination of amine-terminated polyethers in the absence of solvent. Such reaction may be carried out at pressures of from 0.05 to 30.0 MPa, preferably from 3.0 to 15.0 MPa, and temperatures of from 65°–200° C., preferably from 150°–200° C.

The proportions by weight of reactants are in the range 1–50 parts by weight of amine-terminated polyether, preferably 10–50 parts by weight of amine-terminated polyether to 100 parts by weight of guayule resin. A preferred ratio is that sufficient to provide a polyether-crosslinked guayule resin containing about 1–50% total polyether character expressed as alkylene oxide equivalents, preferably about 5–35% total polyether character, and most preferably about 5–12% total polyether character. It is desirable that the polyether-crosslinked resin have a ring-and-ball softening point above about 65° C., as measured using ASTM method E28-67. Softening points below this temperature make handling difficult. Unexpectedly, it has been found that treatments resulting in less than about 14% total polyether character result in a higher softening point, that is at least 65° C.

Higher softening points can be obtained by means of a steam sparge treatment of the resinous reaction product, wherein the steam is at a temperature of between 150°–325° C., preferably between 200°–250° C. The steam sparge is continued until about 20–200 parts of distillate is obtained for every part of residual resin. The distillate, in addition to containing condensed steam, is composed of low molecular weight reaction by-products and possibly unreacted guayule resin components. About 2–50 parts of volatile by-products are removed for every 100 parts of resinous product. Preferably, 2–15 parts of volatile by-products are removed for every 100 parts of resinous product. Accordingly, the product of Example 1, which had undergone no steam sparge, had a ring-and-ball softening point of 33° C. Steam sparging of the product of Example 1 until 14 parts of volatile by-products had been removed for every 100 parts of residual resin yielded the product of Example 2, which had a ring-and-ball softening point of 67° C. More extensive devolatilization affords little improvement in softening point—the product of Example 3 had a ring-and-ball softening point of 68° C. after an additional 7 parts of volatile by-products had been removed for every 100 parts of the resinous product of Example 2.

Additionally, higher softening points can be obtained by using the guayule resin polar fraction rather than the unfractionated guayule resin. Accordingly, the product of Example 4, prepared from the guayule resin polar fraction, had a ring-and-ball softening point of 77° C., whereas the product of Example 2, prepared from unfractionated guayule resin, had a ring-and-ball softening point of 67° C.

The polyether-crosslinked guayule resin of this invention can be added to various rubber formulations to impart various favorable properties such as green strength, cure activation, tear strength, and to reduce the dynamic heat loss, that is the hysteresis loss.

In general, low amounts of polyether-crosslinked guayule resin, that is less than 5 parts per 100 parts of rubber impart reduced hysteresis loss. Progressively higher amounts of polyether-crosslinked guayule resin, that is 5 parts or more per 100 parts of rubber impart shorter scorch time, shorter cure time, and higher cure rate indices. The amount of polyether-crosslinked guayule resin used per 100 parts by weight of rubber is generally from about 0.1–20 parts by weight, desirably from about 0.1–10.0 parts by weight and preferably from about 0.5–5.0 parts by weight.

Generally, any conventional type of rubber compound or formulation can be utilized as well known to the art. Examples of suitable types of rubber include natural rubber, rubber made from diene monomers having from 4 to 12 carbon atoms, including isoprene, butadiene, and the like; rubbers made from interpolymers of diene monomers have from 4 to 12 carbon atoms such as isoprene and butadiene, and the like; rubber copolymers made from diene monomers having from 4 to 12 carbon atoms with other copolymerizable monomers as for example, vinyl substituted aromatics having from 8 to 12 carbon atoms, i.e. styrene, alpha-methylstyrene; or other monomers such as acrylic ester, methyl isopropenyl ketone, isobutylene, acrylonitrile or an unsaturated carboxylic acid; halogenated rubber such as polychloroprene, chlorosulfonated polyethylene, or fluororubbers; terpolymers of one or more monoolefins with a monomer which confers unsaturation on the interpolymer, for example the various types of EPDM terpolymers, butyl rubbers, halobutyl rubbers, norbornene rubbers, polysulfide rubbers, sulfur vulcanizable polyurethane rubber; and blends thereof. Additionally, blends of the above rubbers containing a minor portion of SBS or SIS (styrene and butadiene or isoprene) copolymers can also be used. Additionally, one or more of the above synthetic rubbers can be blended with the various amounts of natural rubber as by example from about 10% to about 95% of natural rubber.

Various amounts of conventional or common rubber additives can be added to the rubber in conventional amounts as well known to the art or as set forth in the Vanderbilt Rubber Handbook, copyright 1978. Thus, various fillers and reinforcing agents such as carbon black or silica can be utilized. Additionally, various processing oils such as aromatic, paraffinic or naphthenic types can be utilized. Other common additives are metal salts such as zinc oxide and the like. Fatty acids can also be utilized such as stearic acid. Still other additives include accelerators such as the various sulfenamide and various antioxidants such as hindered phenols and substituted p-phenylenediamines.

Accordingly, the polyether-crosslinked guayule resin of the present invention can be utilized wherever the above properties are desired such as in tires, including passenger tires, truck tires ad off-the-road tires, hoses, conveyor belts, power and transmission belts, fuel or chemical tank linings, thermal insulation, flotation gear, automotive floor mats, mud flaps, rubber tires, motor mounts, draft gear pads, gaskets, seals, O-rings, bumpers, roofing membranes, tank track pads, shock absorbers, and other mechanical rubber goods.

A property of the polyether-crosslinked guayule resin is that it unexpectedly gives a large increase in the green strength of unvulcanized rubber compositions. Green strength is a measure of the ability of the unvulcanized rubber to resist deformation. Green strength is a significant properly in handling unvulcanized materials. It is often found that agents are preferably added to natural and synthetic rubbers to increase inherent green strength or correct any deficiencies in green strength properties.

Another property of the polyether-crosslinked guayule resin of the present invention is that it unexpectedly yields a large improvement in activating the cure of sulfur-vulcanized rubber compositions. Cure activation is effected by reducing the time to the onset of vulcanization, the scorch time ($t_s2$), or the time to optimum cure, that is the cure time ($t'_c90$), or both. The cure activation is commonly measured by the cure rate index which is defined as the number 100 divided by the quantity $t'_c90$ minus $t_s2$. Thus, the polyether-crosslinked guayule resin is desirably added to natural and synthetic rubber compositions to activate cure, decrease scorch time, and to increase the cure rate index.

Another property of the polyether-crosslinked guayule resin is that it increases the tear strength of vulcanized rubber compositions. Tear strength is the force necessary to propagate a crack or tear under stress. It is often found that reinforcing agents are preferably added to natural and synthetic rubbers to increase tear strength.

An important property of a polyether-crosslinked guayule resin of the present invention is that it dramatically reduces the dynamic heat loss, that is the hysteresis loss, in vulcanized rubber compositions. Hysteresis loss is defined as the ratio of the loss modulus to the storage modulus of a rubber composition and is a measure of the energy dissipated during deformation or flexing in tires such as passenger and truck tires. Decreased hysteresis loss in the rubber compositions also contributes to abating rolling resistance.

The examples given below illustrate both the preparation and use of polyether-crosslinked guayule resin products in a typical rubber recipe. Table I summarizes product physical properties. Table II lists recipe ingredients. These rubber compositions can also contain other conventional additives for rubber such as fillers, accelerators, stabilizers, pigments, and the like. As a control or comparative example, a commercial polyterpene resin sold by Hercules, Incorporated under the name "Piccopale 100" was used.

The green strength, the cure characteristics, the tear strength, and the hysteresis properties were determined in the following manner:

Green strength properties of the unvulcanized compounded stocks were determined using an Instron Model TTD tester. Green strength values are reported as both initial and peak values to more completely describe the stress-strain properties of uncured stocks. Higher values are, of course, desirable. Table III illustrates the substantial improvements in initial and peak green strength obtained with the products of Examples 2 and 4 through 7.

Cure characteristics of the compounded stocks were determined by means of a Monsanto oscillating disc curemeter (ASTM Method D2084-81). The cure data summarized in Table IV show that the products of Examples 2 and 4 through 7 decreased both scorch time and cure time, and increased the cure rate index. This behavior, typical of cure activators, was not obtained with the polyterpene resin.

Tear strength properties of the cured compounded stocks were determined in accordance with ASTM method D624-81 on specimens cut with die B. Table V shows that the products of Examples 2, 4 and 6 imparted improved tear strength.

Dynamic properties of the cured compounded stocks were evaluated as the hysteresis loss factor. This was determined at 23° C. using the well-known MTS Model 830 elastomer test system. Table VI illustrates that the polyether-crosslinked resin products of Examples 2 and 4 through 6 decrease hysteresis loss when added at less than 5 parts per 100 parts of rubber.

The following examples illustrate the preparation of the various polyether-crosslinked guayule resins used to generate the data in the Tables.

EXAMPLE 1

In a reactor equipped with a mechanical stirrer and a Dean-Stark distilling receiver with reflux condenser, 300 parts of guayule resin, $M_n$ 422, and 100 parts of toluene were heated to 110° C. To the heated resin solution was added 49 parts of Jeffamine D-230. The mixture was refluxed until 7.5 parts of water had been collected by azeotropic distillation. Desolventization with a nitrogen sparge to 225° C. afforded 340 parts of a brown resinous product.

EXAMPLE 2

A solution of 224.5 parts of the resinous product of Example 1 in 150 parts of toluene was desolventized with a nitrogen sparge up to 225° C., followed by a steam sparge at 225°-235° C. to distill 27 parts of volatile by-products. The total distillate yield was about 102 parts. In this manner was obtained 197 parts of a brown resinous product.

EXAMPLE 3

A solution of 149.5 parts of the resinous product of Example 2 in 150 parts of toluene was desolventized with a nitrogen sparge up to 210° C. This was followed by a steam sparge at 210°-225° C. to distill 10 parts of volatile by-products. The total distillate yield was about 160 parts. In this manner was obtained 139.5 parts of a brown resinous product.

EXAMPLE 4

Following the procedure in Example 1, 200 parts of guayule resin polar fraction, $M_n$ 550, and 32.5 parts of Jeffamine D-230 were reacted until 5 parts of water had been collected. After desolventization, a steam sparge at 190°-210° C. was used to distill 22 parts of volatile by-products. The total distillate yield was about 72 parts. In this manner was obtained 205 parts of a brown resinous product.

EXAMPLE 5

A mixture of 300 parts of guayule resin polar fraction and 48.5 parts of Jeffamine D-230 heated to 165°-170° C. The pressure in the reactor was reduced to about 3-10 MPa by means of a vacuum pump to facilitate distillation of 10 parts of volatile by-products. The reactor pressure was returned to atmospheric and the reaction mixture treated with a steam sparge at 210°-225° C. to distill an additional 16 parts of volatile by-products. The total steam distillate yield was about 94 parts. In this manner was obtained 322 parts of a brown resinous product.

EXAMPLE 6

Following the procedure in Example 1, 200 parts of guayule resin and 43.4 parts of Jeffamine T-403 were reacted until 4.5 parts of water had been collected. After desolventization, a steam sparge at 210°-225° C.

was used to distill 13.5 parts of volatile by-products. The total distillate yield was about 39 parts. In this manner was obtained 213.5 parts of a brown resinous product.

EXAMPLE 7

Following the procedure in Example 1, 200 parts of guayule resin polar fraction and 86.5 parts of Jeffamine ED-600 were reacted until 5 parts of water had been collected. After desolventization, a steam sparge at 210°–225° C. was used to distill 7 parts of volatile by-products. The total distillate yield was about 114 parts. In this manner was obtained 269.5 parts of a brown resinous product.

TABLE I
POLYETHER-CROSSLINKED GUAYULE RESIN PHYSICAL PROPERTIES

| Resin Example No. | Polyether Weight %* | sp. °C. | Mn |
|---|---|---|---|
| 1 | 9 | 33 | — |
| 2 | 11 | 67 | 740 |
| 3 | 12 | 68 | — |
| 4 | 10 | 77 | 775 |
| 5 | 10 | 71 | 884 |
| 6 | 14 | 51 | 540 |
| 7 | 28 | 27 | 805 |

*Total weight percent —OCH$_2$CH— and —OCH$_2$CH$_2$— in resin.
                         |
                         CH$_3$

TABLE II
RUBBER TEST RECIPE

| Ingredients | Parts by Weight |
|---|---|
| 1. NR | 50 |
| 2. SBR | 50 |
| 3. HAF Carbon black | 50 |
| 4. Medium aromatic process oil | 3 |
| 5. Zinc oxide | 3 |
| 6. Stearic acid | 2 |
| 7. Antioxidant (substituted p-phenylenediamine) | 1 |
| 8. Sulfenamide accelerator | 1 |
| 9. Sulfur | 1 |
| 10. Polyether-crosslinked guayule resin | Variable |

TABLE III
GREEN STRENGTH PROPERTIES DATA

| Resin Example No. | Level phr | Green Strength, MPa Initial | Green Strength, MPa Peak |
|---|---|---|---|
| Control | 0 | 0.28 | 0.75 |
| Polyterpene resin | 1 | 0.28 | 0.90 |
| Polyterpene resin | 6 | 0.28 | 1.19 |
| 2 | 1 | 0.34 | 1.16 |
| 2 | 2 | 0.34 | 1.16 |
| 2 | 5 | 0.37 | 1.26 |
| 4 | 1 | 0.36 | 0.81 |
| 4 | 2 | 0.34 | 1.00 |
| 4 | 5 | 0.36 | 1.10 |
| 5 | 1 | 0.48 | 1.56 |
| 5 | 2 | 0.48 | 1.47 |
| 5 | 5 | 0.48 | 1.46 |
| 6 | 1 | 0.34 | 1.11 |
| 6 | 2 | 0.39 | 1.70 |
| 6 | 5 | 0.39 | 1.76 |
| 7 | 1 | 0.44 | 1.30 |
| 7 | 2 | 0.47 | 1.61 |
| 7 | 5 | 0.49 | 1.38 |

TABLE IV
CURE DATA, 150° C.

| Resin Example No. | Level, phr | t$_s$2, min. | t'$_c$90, min. | CRI | M$_H$,dN · m |
|---|---|---|---|---|---|
| Control | 0 | 9.6 | 16.3 | 14.9 | 36.0 |
| Polyterpene resin | 1 | 9.2 | 14.8 | 17.8 | 42.0 |
| Polyterpene resin | 6 | 9.8 | 16.4 | 15.1 | 41.7 |
| 2 | 1 | 8.5 | 14.6 | 16.4 | 44.4 |
| 2 | 2 | 7.9 | 13.4 | 18.2 | 44.0 |
| 2 | 5 | 6.3 | 10.3 | 25.0 | 42.7 |
| 4 | 1 | 8.2 | 14.2 | 16.7 | 45.6 |
| 4 | 2 | 7.9 | 13.3 | 18.5 | 45.0 |
| 4 | 5 | 5.7 | 9.4 | 27.0 | 41.7 |
| 5 | 1 | 7.6 | 13.9 | 15.9 | 46.4 |
| 5 | 2 | 6.4 | 11.7 | 18.9 | 46.4 |
| 5 | 5 | 4.6 | 8.5 | 25.6 | 44.4 |
| 6 | 1 | 8.0 | 13.8 | 17.2 | 45.0 |
| 6 | 2 | 6.7 | 11.4 | 21.3 | 44.4 |
| 6 | 5 | 4.1 | 7.3 | 31.2 | 43.2 |
| 7 | 1 | 6.5 | 12.4 | 16.9 | 46.6 |
| 7 | 2 | 5.4 | 10.7 | 18.9 | 46.4 |
| 7 | 5 | 3.0 | 6.7 | 27.0 | 45.2 |

TABLE V
TEAR PROPERTIES DATA*

| Resin Example No. | Level, phr | Tear Strength, kN/m |
|---|---|---|
| Control | 0 | 49.6 |
| Polyterpene resin | 1 | 52.2 |
| Polyterpene resin | 6 | 58.3 |
| 2 | 1 | 52.5 |
| 2 | 2 | 53.2 |
| 2 | 5 | 54.9 |
| 4 | 1 | 56.1 |
| 4 | 2 | 53.5 |
| 4 | 5 | 56.3 |
| 5 | 1 | 49.8 |
| 5 | 2 | 50.0 |
| 5 | 5 | 47.9 |
| 6 | 1 | 54.5 |
| 6 | 2 | 52.8 |
| 6 | 5 | 54.1 |
| 7 | 1 | 48.7 |
| 7 | 2 | 48.8 |
| 7 | 5 | 47.7 |

*Stocks cured 30 min. at 150° C.

TABLE VI
DYNAMIC PROPERTIES DATA*

| Resin Example No. | Level, phr | Hysteresis Loss Factor |
|---|---|---|
| Control | 0 | 0.181 |
| Polyterpene resin | 1 | 0.174 |
| Polyterpene resin | 6 | 0.185 |
| 2 | 1 | 0.167 |
| 2 | 2 | 0.174 |
| 2 | 5 | 0.204 |
| 4 | 1 | 0.161 |
| 4 | 2 | 0.183 |
| 4 | 5 | 0.193 |
| 5 | 1 | 0.160 |
| 5 | 2 | 0.166 |
| 5 | 5 | 0.196 |
| 6 | 1 | 0.157 |
| 6 | 2 | 0.167 |
| 6 | 5 | 0.189 |
| 7 | 1 | 0.172 |
| 7 | 2 | 0.182 |
| 7 | 5 | 0.213 |

*Stocks cured 30 min. at 150° C.

The above data clearly reveals that the use of polyether-crosslinked guayule-type resins of the present invention resulted in significant increases in building tack, green strength and tear strength. Furthermore, the time to onset vulcanization and cure time as well as the cure rate index was reduced as was generally the hysteresis loss factor. Thus, the guayule treated resin of the present invention imparts favorable properties when utilized in association with rubber elastomers.

While in accordance with the patent statutes a best mode and preferred embodiment has been set forth, it is to be understood that numerous variations, permutations and combinations can be made within the scope of the present invention and accordingly the scope of the invention is set forth by the scope of the attached claims.

What is claimed is:

1. A composition of matter, comprising:
guayule resin chemically crosslinked by treatment with an amine terminated polyether, said polyether having the formula

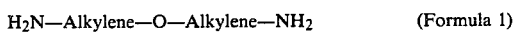

$$H_2N-Alkylene-O-Alkylene-NH_2 \quad \text{(Formula 1)}$$

wherein each said alkylene, independently, has from 2 to about 10 carbon atoms, and wherein said n is an integer of from about 2 to about 100, or a polyether having the formula

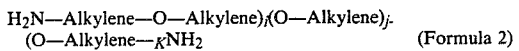

$$H_2N-Alkylene-O-Alkylene)_i(O-Alkylene)_j-(O-Alkylene-)_kNH_2 \quad \text{(Formula 2)}$$

wherein each said alkylene, independently, has from 2 to about 10 carbon atoms, wherein i plus k is an integer of from about 2 to about 25, wherein said j is an integer from about 1 to about 200, or a polyether having the formula

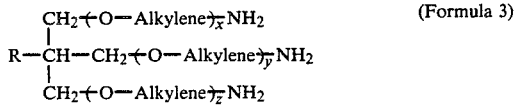

$$\begin{array}{c} CH_2\text{+}O-Alkylene\text{)}_{\overline{x}}NH_2 \\ | \\ R-CH-CH_2\text{+}O-Alkylene\text{)}_{\overline{y}}NH_2 \\ | \\ CH_2\text{+}O-Alkylene\text{)}_{\overline{z}}NH_2 \end{array} \quad \text{(Formula 3)}$$

wherein each said alkylene, independently, has from 2 to about 10 carbon atoms, wherein x+y+z is an integer of from about 2 to about 100, and wherein R is hydrogen or an aliphatic group having from 1 to 5 carbon atoms.

2. A composition according to claim 1, wherein said guayule resin is treated with from about 1 to about 50 parts by weight of said polyether per 100 parts by weight of said guayule resin.

3. A composition of matter according to claim 2, wherein n of said polyether formula is from about 2 to about 70, wherein i+k is from about 2 to about 10, wherein j is from about 2 to about 150, wherein x+y+z is from about 2 to about 10, and wherein R is an alkyl having from 1 to 5 carbon atoms.

4. A composition of matter according to claim 3, wherein said chemically treated guayule resin has a softening point of at least 65° C. according to ASTM method E28-67.

5. A composition of matter according to claim 4, wherein said alkylene of each said formula, independently, has 2 or 3 carbon atoms, wherein n is from about 2 to about 5, wherein i+k is from about 2 to about 5, wherein j is from about 2 to about 10, wherein x+y+z is from about 5 to about 10, and wherein R is an alkyl having 1 or 2 carbon atoms.

6. A composition according to claim 5, wherein said guayule resin is treated with from about 10 to about 50 parts by weight of said polyether per 100 parts by weight of said guayule resin.

7. A composition of matter according to claim 4, including carrying out said polyether treatment at a temperature of from about 65° to about 200° C., and wherein said treatment is carried out under atmospheric pressure or under vacuum.

8. A composition of matter according to claim 7, wherein said guayule resin is sparged before treatment by said polyether.

9. A composition of matter according to claim 4, wherein said polyether treated guayule resin contains from about 1 to about 50% alkylene oxide equivalents.

10. A composition according to claim 6, wherein said polyether treated guayule resin contains from about 5 to about 35% alkylene oxide equivalents, and wherein said polyether treatment is carried out at a temperature of from about 65° C. to about 130° C.

11. A rubber composition comprising an effective amount of the composition of claim 1 to impart improved physical properties thereto.

12. A rubber composition containing from about 0.1 to about 20 parts by weight of the composition of claim 1 per 100 parts by weight of the rubber composition, and wherein said guayule resin is treated with from about 1 to about 50 parts by weight of said polyether per 100 parts by weight of said guayule resin.

13. A rubber composition according to claim 12, wherein the amount of said polyether treated guayule resin is from about 0.1 to about 10 parts by weight per 100 parts by weight of said rubber composition; wherein n of said polyether formula is from about 2 to about 70, wherein i+k is from about 2 to about 10, wherein j is from about 2 to about 150, wherein x+y+z is from about 2 to about 10, and wherein said chemically treated guayule resin has a softening point of at least 65° C. according to ASTM method E28-67.

14. A rubber composition according to claim 13, wherein said alkylene of each said formula, independently, has 2 or 3 carbon atoms, wherein n is from about 2 to about 5, wherein i+k is from about 2 to about 5, wherein j is from about 2 to about 10, wherein x+y+z is from about 5 to about 10, wherein R is an alkyl having 1 or 2 carbon atoms, and wherein said guayule resin is treated with from about 10 to about 50 parts by weight of said polyether per 100 parts by weight of said guayule resin.

15. A rubber composition according to claim 13, wherein said polyether treated guayule resin contains from about 1 to about 50% alkylene oxide equivalents, including carrying out said polyether treatment at a temperature of from about 65° C. to about 200° C.

16. A mechanical rubber good having as a component thereof the composition of claim 12.

17. A tire having as a component thereof the composition of claim 12.

18. A tire having a component thereof the composition of claim 14.

* * * * *

UNITED STATES PATENT AND TRADEMARK OFFICE
CERTIFICATE OF CORRECTION

PATENT NO. : 4,622,365
DATED : November 11, 1986
INVENTOR(S) : William W. Schloman, Jr., et al.

It is certified that error appears in the above-identified patent and that said Letters Patent is hereby corrected as shown below:

On the title page, Inventor's name should read

-- William W. Schloman, Jr. --.

Signed and Sealed this

Seventeenth Day of February, 1987

Attest:

DONALD J. QUIGG

*Attesting Officer*   *Commissioner of Patents and Trademarks*